(12) United States Patent
Barringer et al.

(10) Patent No.: US 10,134,101 B2
(45) Date of Patent: Nov. 20, 2018

(54) USING COST ESTIMATION TO IMPROVE PERFORMANCE OF TILE RENDERING FOR IMAGE PROCESSING

(75) Inventors: Rasmus Barringer, Helsingborg (SE); Tomas G. Akenine-Moller, Lund (SE)

(73) Assignee: Intel Corporation, Santa Clara, CA (US)

( * ) Notice: Subject to any disclaimer, the term of this patent is extended or adjusted under 35 U.S.C. 154(b) by 397 days.

(21) Appl. No.: 13/991,960

(22) PCT Filed: Feb. 27, 2012

(86) PCT No.: PCT/US2012/026677
§ 371 (c)(1),
(2), (4) Date: Jun. 6, 2013

(87) PCT Pub. No.: WO2013/130030
PCT Pub. Date: Sep. 6, 2013

(65) Prior Publication Data
US 2013/0335429 A1   Dec. 19, 2013

(51) Int. Cl.
*G06T 1/20* (2006.01)
*G06T 15/00* (2011.01)
*G06T 15/40* (2011.01)

(52) U.S. Cl.
CPC .............. *G06T 1/20* (2013.01); *G06T 15/005* (2013.01); *G06T 15/405* (2013.01); *G06T 2210/52* (2013.01)

(58) Field of Classification Search
CPC .................. G09G 5/14; G09G 2340/10; G09G 2340/125; G06T 11/60; H04N 5/44504
See application file for complete search history.

(56) References Cited

U.S. PATENT DOCUMENTS

| | | | |
|---|---|---|---|
| 7,023,437 B1 * | 4/2006 | Voorhies et al. | 345/420 |
| 7,307,628 B1 * | 12/2007 | Goodman et al. | 345/421 |
| 7,426,320 B2 | 9/2008 | Stevens | |
| 7,502,035 B1 * | 3/2009 | Moreton | 345/611 |
| 7,659,893 B1 * | 2/2010 | Oberman et al. | 345/422 |
| 7,961,185 B2 | 6/2011 | Strom | |
| 8,004,517 B1 | 8/2011 | Edelsbrunner et al. | |
| 8,497,876 B2 | 7/2013 | Yuen | |
| 2005/0162434 A1 * | 7/2005 | Hancock et al. | 345/501 |
| 2007/0165035 A1 * | 7/2007 | Duluk et al. | 345/506 |
| 2007/0253028 A1 * | 11/2007 | Widdowson | 358/1.18 |
| 2009/0202114 A1 * | 8/2009 | Morin et al. | 382/118 |

(Continued)

FOREIGN PATENT DOCUMENTS

| | | | |
|---|---|---|---|
| CN | 102208112 A | 10/2011 | |
| CN | 102279978 A | 12/2011 | |

(Continued)

OTHER PUBLICATIONS

PCT International Search Report and Written Opinion issued in corresponding PCT/US2012/026677 dated Nov. 23, 2012 (10 pages).

(Continued)

*Primary Examiner* — Todd Buttram
(74) *Attorney, Agent, or Firm* — Trop Pruner & Hu, P.C.

(57) ABSTRACT

An analysis of the cost of processing tiles may be used to decide how to process the tiles. In one case two tiles may be merged. In another case a culling algorithm may be selected based on tile processing cost.

15 Claims, 6 Drawing Sheets

(56) References Cited

U.S. PATENT DOCUMENTS

| | | | |
|---|---|---|---|
| 2009/0208098 A1* | 8/2009 | Yang | 382/164 |
| 2010/0164949 A1* | 7/2010 | Min et al. | 345/419 |
| 2011/0072244 A1* | 3/2011 | Lindholm et al. | 712/214 |
| 2011/0102440 A1 | 5/2011 | Yuen et al. | |
| 2011/0164038 A1* | 7/2011 | Jung et al. | 345/420 |
| 2011/0298813 A1 | 12/2011 | Barringer | |
| 2012/0147027 A1* | 6/2012 | Molnar et al. | 345/582 |
| 2012/0293519 A1* | 11/2012 | Ribble et al. | 345/501 |
| 2013/0181991 A1* | 7/2013 | Nilsson et al. | 345/422 |
| 2013/0287314 A1* | 10/2013 | Toth et al. | 382/275 |

FOREIGN PATENT DOCUMENTS

| | | |
|---|---|---|
| TW | I325572 B | 6/2010 |
| TW | 201118796 A | 6/2011 |
| TW | 201137786 A | 11/2011 |
| WO | 2011156164 A2 | 12/2011 |

OTHER PUBLICATIONS

Taiwan Search Report issued in corresponding TW102106680 dated Apr. 2, 2015 [w/English translation] (4 pages).

EP search report in corresponding EP application No. 12869652.3 dated Oct. 20, 2015 (9 pages).

EP office action in corresponding EP application No. 12869652.3 dated Jul. 18, 2016 (4 pages).

TW search report in corresponding TW application No. 102106680 dated May 12, 2014 (2 pages).

Schneider, "Parallel Pologon Rendering," SIGGRAPH course, Jan. 1, 2000, pp. 1-19.

Roble, "A Load Balanced Parallel Scanline Z-Buffer Algorithm for the iPSC Hypercube," Actes Du 1er Colloque Scientifique International PIXM 88, L'Image Numerique GBP A Paris, Oct. 24-28, 1988.

* cited by examiner

USING COST ESTIMATION TO IMPROVE PERFORMANCE OF TILE RENDERING FOR IMAGE PROCESSING

BACKGROUND

A tiling rendering architecture subdivides a computer generated image into smaller parts to be rendered separately. Each part is called a tile. The pipeline of a tiling rendering architecture often consists of a front-end and a back-end. The front-end performs vertex-shading on the vertices in the scene and sorts each resulting triangle into the tiles it overlaps. Note that shading of non-geometric attributes may be delayed until the back-end. The back-end, occurring after the front-end, processes each tile separately by vertex-shading any remaining attributes, rasterizing its triangles and pixel-shading the resulting fragments.

Parallel hardware with many independent execution units, called cores, needs a strategy to distribute rendering work evenly among the cores for full utilization of its resources, i.e. the work needs to be load balanced. This is extremely important as the rendering performance can be substantially higher depending on how this is done.

The front-end can split the scene geometry into suitable chunks for each core to process in parallel. Each such chunk is called a geometry batch. The splits can be arbitrary and, thus, it is easy to achieve good load balance in the front-end. The back-end is inherently parallel since each tile can be processed independently. This does, however, not guarantee a good load balance. Depending on the distribution of geometry and shading complexity in the scene, the majority of work may end up in only a few of the tiles. In the worst case, a single tile is expensive and the rest is cheap. This results in a load imbalance since the core that picks the expensive tile will require a lot of time to process it. During this time the remaining cores will be idle since they finish their work quickly.

BRIEF DESCRIPTION OF THE DRAWINGS

Some embodiments are described with respect to the following figures.

DETAILED DESCRIPTION

Figure 1:
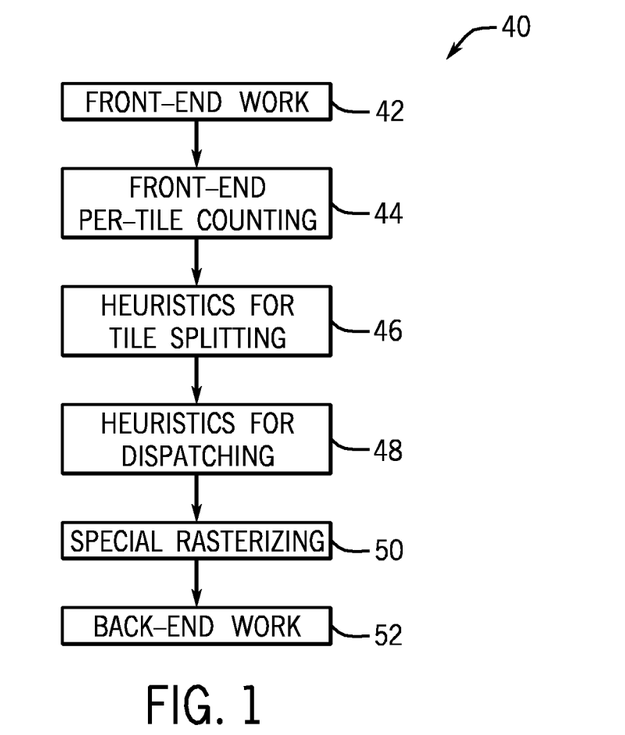
FIG. 1 is a flow chart for one embodiment.

A combination of techniques may be used to balance the load of the back-end in a tiling rendering pipeline. As shown in FIG. 1, after the front-end work 42, the components, in some embodiments, include a pipeline 40 used to estimate the cost of a given tile, front-end per-tile counters 44 recording information required by the cost model, heuristics 46 for when to split a tile, heuristics 48 for ordering the dispatching of work to the cores, and a special rasterizer 50 that discards triangles and fragments outside a sub-tile. Then the back-end work 52 may be done.

The only way to accurately find out how much time is required for a single core to perform the back-end work of a tile, is to actually perform the work. However, it is desirable to know approximately how long the required time is without actually doing the work. To that end, an inexpensive cost estimation model calculates how much time is required to perform the back-end work for a tile in one embodiment. When that has been done for all tiles, there is a significantly higher chance of distributing the work of all the tiles evenly among the available cores.

The cost estimation model may use data that can be recorded from a typical front-end to give an estimate for the time required to process a given tile in the back-end. In order to estimate the cost of a single triangle we need to know approximately how many samples it covers. Ideally, the area of the intersection between the "parent" tile and the triangle may be used as a measure of how many samples a triangle covers. This may not be feasible to compute since it may involve expensive clipping of each triangle. Alternatively, each triangle can be roughly classified using observations made in the front-end when determining overlapping tiles, e.g. if the triangle is covering the whole tile. Additionally, really small triangles may use a special code path in the rasterizer, motivating the need for a special classification for such triangles. The different classifications are called triangle types. Note that the triangle types are independent of the current rendering state such as pixel shading or z-buffer mode. The data for a given tile may include, but is not limited to the number of triangles of a certain triangle type binned to the tile, the sum of the pixel shading cost, e.g. cycles required to execute a certain pixel shader for a single fragment, for each triangle of a certain triangle type binned to the tile, and the number of triangles of a certain triangle type binned to the tile adhering to a specific rendering state, e.g. stencil-only or with early-z-cull enabled.

It is also useful to include counters for higher level constructs, such as the number of geometry batches containing triangles that overlap a tile. Each geometry batch will typically incur a certain amount of overhead.

The model may use this data to form linear and logarithmic terms whose weighted sum represents the time it takes to process the tile in some embodiments. The logarithmic terms are used to model occlusion, i.e. when a triangle is visible it will usually take longer time to process that triangle since all shading needs to be computed for the pixels covered by the triangle, and when the triangle is occluded (obscured) by previously rendered triangles, execution will be less expensive. A model may be used that converges to the logarithm of the number of overlapping triangles per pixel. See Cox, Michael, and Pat Hanrahan, "Pixel merging for object-parallel rendering: a distributed snooping algorithm," Proceedings of the 1993 Symposium on Parallel Rendering, pp. 49-56 (1993).

The weights are determined by fitting the model to measured timings. This fitting can be performed at runtime at suitable intervals or offline using data from numerous scenes. The logarithmic function used may be the floor of the 2-logarithm which is very efficient to calculate for integers. A non-linear model is:

$$t = A + \sum_i B_i x_i + C\log\left(1 + \sum_i D_i x_i\right) \quad (1)$$

where t is the processing time and $x_i$ are the values of the counters. A, $B_i$, C and $D_i$ are constants found through fitting. Since this model is non-linear, it is suitable for offline fitting. The value of 1 is added within the logarithm to ensure that the resulting value is zero when there are no contributing counters.

A linear model is:

$$t = A + \sum_i B_i x_i + \sum_i C_i \log(1 + x_i) \quad (2)$$

This model is suitable for runtime fitting since it is comparatively inexpensive to perform linear fitting.

It may not make sense to include logarithmic terms for all counters. Since the goal is to model occlusion, which saves shading time when a fragment is occluded, only shading-based counters for geometry with early-z-cull enabled may be included, in some embodiments, i.e. the constants for other logarithmic terms should be zero.

It is up to the implementer of the rendering pipeline to decide which terms to include in the cost estimation. If the linear model is used (Equation 2), all information can be gathered when rendering frame n, and before rendering of frame n+1 starts, the coefficients are recomputed based on the gathered information. These coefficients are then used in Equation 2 to estimate the cost of each tile. One can also update the coefficients with a sliding average update, such as:

$$a_{n+1} = k a_{new} + (1-k) a_n \quad (3)$$

where $a_t$ is a vector containing all the constants, i.e. A, $B_j$ and $C_j$, of the linear model.

This approach avoids sudden jumps in the cost estimation model that otherwise may cause values to oscillate even when rendering an identical frame multiple times. The oscillation is possible since changing the model may change how tiles are split. This may in turn change the measurements used to correct the model. The value of k is up to the user to set in the range of [0,1]. When k=1, we do not include the previous values of a, and when k=0, we do not include the new value (which is therefore meaningless). The value should be somewhere in-between, e.g. k=0.5.

The front-end is modified to include per-tile counters for the information required by the cost estimation model. Prior to the front-end, all such counters may be initialized to zero. Each time a triangle is binned to a tile, its triangle type is determined and the counter for that triangle type incremented. Other counters, e.g. those containing the sum of the pixel shader cost for a certain triangle type, are also modified accordingly.

Note that if the weights are known beforehand, e.g. from offline fitting, all counters for linear terms can be collapsed into a single score by pre-multiplying the weights, thus reducing the storage requirements.

Figure 2:
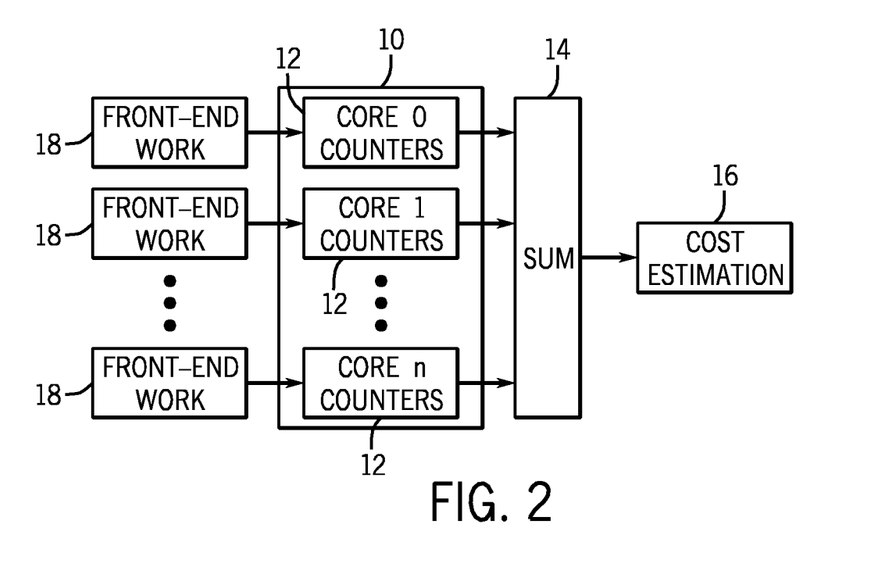
FIG. 2 is a flow chart for one embodiment.

Since several cores typically access the same counters, it may be beneficial to have a unique set 10 of counters 12 for each core, as shown in FIG. 2. This way, inter-core synchronization can be avoided. When estimating the cost for a tile, these per-core counters 12, coupled to front end work 18, need to be accumulated (as indicated at 14) into a single set of counters used by the cost estimation model 16.

Figure 3:
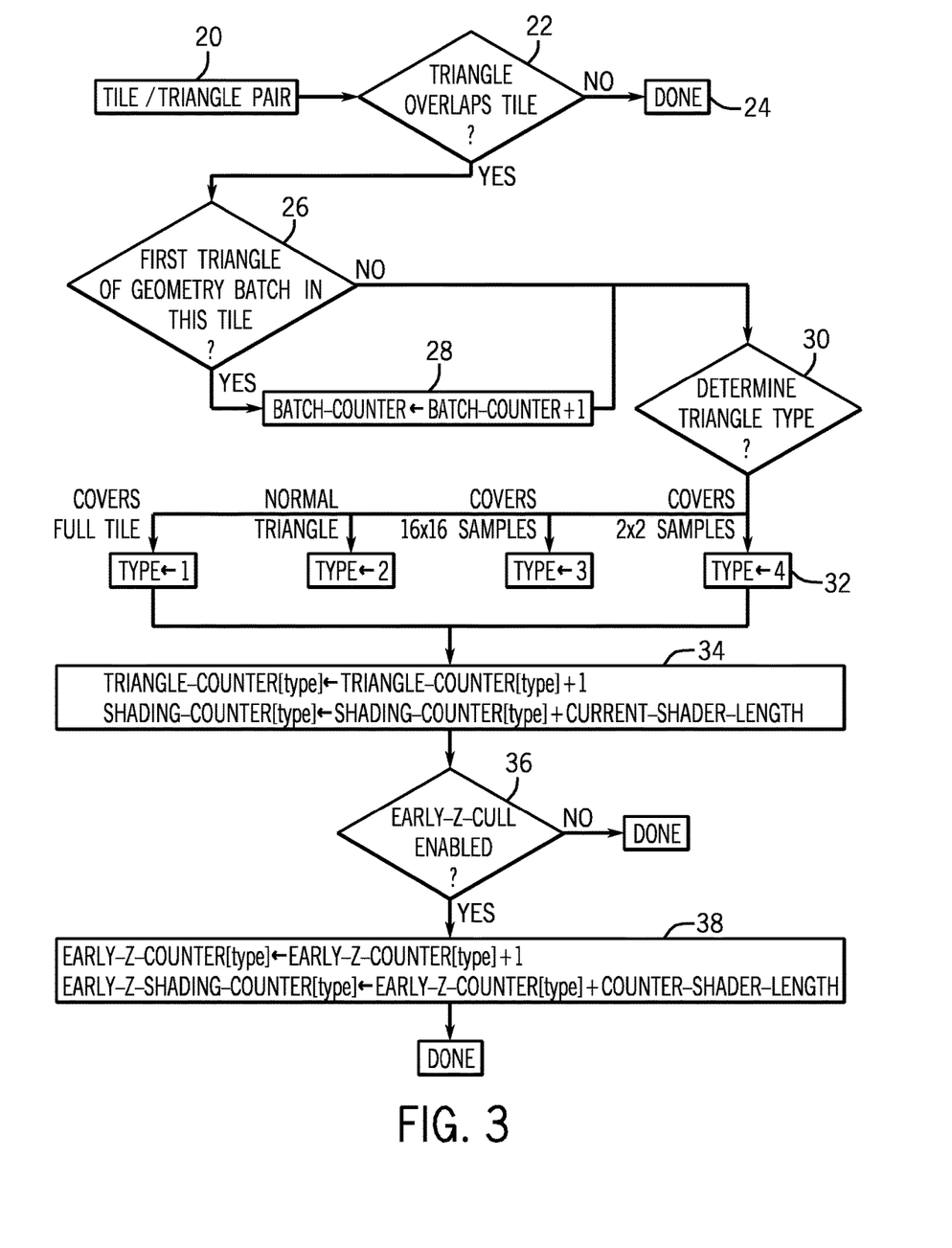
FIG. 3 is a flow chart for one embodiment.

An example of how the front-end increments its counters, when a triangle is binned to a tile, is shown in FIG. 3. A tile/triangle pair is received at 20. A check at diamond 22 determines whether the triangle overlaps the tile. If not, the flow is over, as indicated at 24. If so, a check at diamond 26 determines whether this is the first triangle of a geometry batch in this tile. If so, then the batch counter is incremented at 28. Then, the triangle type is determined at diamond 30. At the next stage, indicated at 32, a type one is indicated if the triangle covers the full tile, a type two is indicated if it is a triangle that does not fall within the other types, a type three is indicated if it covers 16×16 samples, and a type four is indicated if it covers 2×2 samples. Other triangle types are possible depending on the rasterization architecture. Then, at 34, the Triangle-Counter[type] is incremented and the current shader length is added to the Shader-Counter[type].

At diamond 36, a check determines whether early-Z-cull (i.e. Z-culling before pixel shading) is enabled. If not, the flow is done and, otherwise, the Early-Z-Counter[type] is incremented at block 38 and the current shader length is added to the Early-Z-Shading-Counter[type].

After the front-end, the splitting heuristic 46 (FIG. 1) is used to determine which tiles to split. As an example, if a tile covers 128×128 pixels, the tile may be split into two non-overlapping 64×128 sub-tiles. The idea is that the cost for rendering one such sub-tile will be approximately half of the rendering time of the full tile. Hence, tile splitting can potentially reduce the time required to render a tile to 50% if the tile is split, and the sub-tiles' back-end work is performed on two cores in parallel.

The first step of the splitting heuristic is to estimate the cost of all tiles using the cost estimation model and the per-tile counters. The n most expensive tiles are then selected and split recursively until the cost of each sub-tile is below a certain threshold th (with the assumption that the cost of a sub-tile relative the cost of the whole tile is in direct relation to their areas in pixels). There is generally a certain overhead associated with splitting a tile. It is therefore advantageous to only split when it is actually needed. Oversplitting can lead to worse performance. If a scene has several independent render targets and/or multiple frames in flight at the same time, it might not be beneficial to split even expensive tiles. Because of this the threshold, th, is modified according to the amount of work in concurrent render targets.

The ordering heuristic 48 (FIG. 1) attempts to get expensive tiles started with their back-end work as early as possible. This reduces the load imbalance at the end of the back-end. Therefore, the tiles are sorted based on their estimated cost, after splitting. They are then dispatched to available cores in that order, starting with the most expensive (sub-) tiles. If the tiles were sorted during the splitting phase, it may be unnecessary to sort them again. In this case the sub-tiles could all be inserted at an appropriate location in the work queue to ensure approximate cost based ordering.

An apparatus comprises a cost estimation unit to determine whether to merge two tiles and a multiple-core processor to work on one tile at a tile. A special rasterizer 50 (FIG. 1) may be used for the tile splitting purpose. Without the special rasterizer, it would be less beneficial to split a tile. After splitting, one could redistribute a tile's triangles amongst its sub-tiles, i.e. test which sub-tiles a triangle overlaps, and for each such sub-tile, put the triangle in the sub-tile's triangle list. However, this does not fit well into the front-end/back-end divided pipeline. It would simply require a lot of changes to the current pipeline to make this happen. A better way is to let each core working on a sub-tile go through the entire triangle list of the "parent" tile. The special rasterizer then discards triangles outside the sub-tile's region. It may also be modified to efficiently discard fragments outside the sub-tile during scan conversion. During hierarchical rasterization, the special rasterizer simply terminates the hierarchical traversal if the code reaches pixel regions outside the subtile's pixel region. This makes the changes very small and compact to current pipelines, which is highly desirable in some embodiments. It may also incorporate a triangle bounding-box test prior to scan conversion in order to quickly reject triangles that are outside the sub-tile altogether. In one embodiment, a tile is always split in half, along the longer axis, which results in dimensions that are always a power of two (assuming that the parent tile's dimensions are a power of two). Most rejection tests can thus be implemented using efficient shift operations.

Offline rendering with renderers based on rasterization can be used in some embodiments. Since rendering cost is much more expensive in this case, the estimation cost will be relatively less expensive, and therefore it makes sense to use this technique also in that context. In addition, some embodiments can also be used to great benefit also for higher order primitives (e.g., displaced Bézier surfaces, displaced subdivision surfaces, and arbitrary displacement shaders).

Some embodiments may balance the load of a single render target to maximize utilization and minimize latency. At the same time, the memory footprint may not be significantly increased. A special rasterizer may, in some cases, make the implementation substantially less complex.

Instead of splitting tiles, it is also possible to merge two tiles whose costs are estimated to be sufficiently low. If two neighboring tiles are relatively inexpensive to process in the back end, the tiles may be merged into one tile. Since the overhead for processing a tile is non-insignificant, one can gain performance by merging two tiles into a larger tile.

The dynamic cost estimation, t, may be used to determine when to perform the tile merger. Assume we have N×M tiles over the screen, and that in the initial stage we want to investigate whether the left and right neighboring tiles can be merged. For example, a tile at position (0,0) might be merged with a tile at position (1,0). In this example, there are N×M/2 pairs that can be tested for merging. However, tiles that are already listed as too expensive to merge need not be tested.

For all other tiles, we compute their combined cost. Assume that we investigate whether two tiles should be merged and one is located on the left and one is located on the right and that we have estimated their cost to be $t_L$ and $t_R$. The sum of their costs is then $t_{sum}=t_L+t_R$. When we have computed all the summed costs for all the relevant pairs, then we can sort these costs and merge only the smallest costing tiles.

Other strategies for determining how many pairs to merge may also be used. For example, it may be assumed that there are T tiles in total including combined tiles, sub-tiles and tiles and this is compared to a number C of the cores in the target processing machine. One can, for example continue merging/splitting until $k_0$ is less than T/C which is less than $k_1$, where $k_0$ is less than $k_1$, and $k_0$ and $k_1$ are user defined constants. As another example, one can merge tiles until the strategy just described is fulfilled or when merging stops due other conditions such all the S smallest tiles have been merged.

One can of course perform another step of merging, just as more than one splitting step can be done. That is, the merging can be done hierarchically in the same way that the splitting can be done hierarchically.

Figure 4:
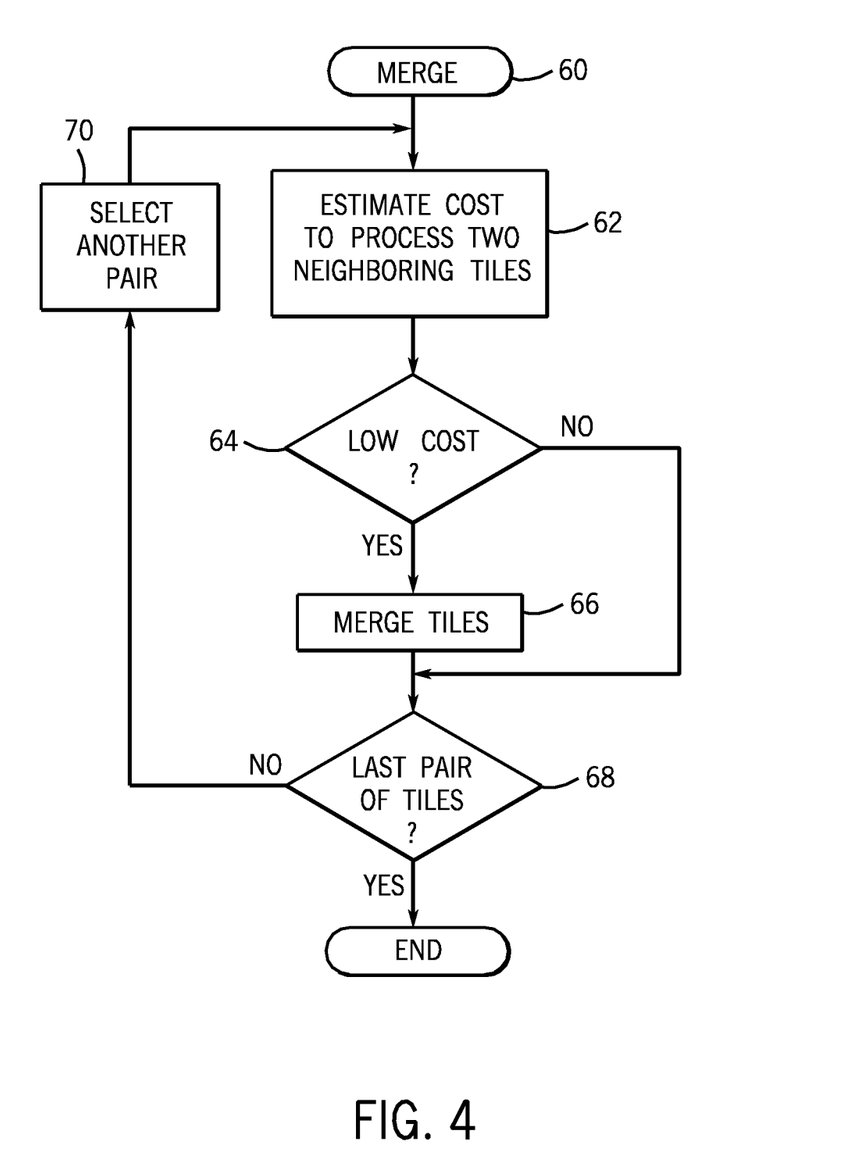
FIG. 4 is a flow chart for one embodiment.

A merge sequence 60 shown in FIG. 4 may be implemented in software, firmware and/or hardware. In software and firmware embodiments it may be implemented by computer executed instructions stored in a non-transitory computer readable medium such as an optical, magnetic or semi-conductor storage.

The sequence 60 begins by estimating the cost to process two neighboring tiles as indicated in block 62. If the cost is low enough as determined in diamond 64, the tiles are merged as indicated at block 66. If the cost is not low enough, the merging step is skipped. Then a check at diamond 68 determines where the last pair of tiles have been checked. If so, the flow ends.

Otherwise the flow goes back to block 70 which selects another pair of tiles to analyze for merger. Likewise if the cost is not sufficiently low to justify the merger in diamond 64, another pair of tiles is selected in block 70 for analysis.

Culling techniques are often advantageous in graphics processing because they avoid unnecessary work that would not improve the final image anyway. An example is view frustum culling that avoids processing triangles that are outside the field of view. Note however, that it costs computations to determine whether a triangle is outside the field of view and thus can be culled. Culling only provides a gain if the cost of culling is less than the cost of fully processing the culled geometry/pixels/etc. For occlusion culling, a lot of geometry needs to be processed in a tile before there will be any occluding "power" that can actually cull anything. Hence, we note that our dynamic cost estimation can be used to detect tiles with high geometric complexity, and for those tiles, we can enable more advanced and more processing complex forms of occlusion culling.

Even after splitting has been done, there may be subtiles that are more expensive than others because they contain more geometry, bigger geometry or geometry with more advanced shaders, to mention a few examples. If all the terms are grouped in the cost estimation model that have to do with geometry (e.g. size of triangles, number of triangles, etc.) then we have a measure of geometric complexity in the tile. For inexpensive tiles, there may be overhead in adding more advanced form of occlusion culling, and in these cases, occlusion culling may be avoided because it will not increase performance anyway. For tiles of high estimated geometrical complexity, we can choose to dynamically enable more advanced forms of occlusion culling.

Hence, if t is greater than A, where A is a user-defined or otherwise provided value such as a fixed constant, then we enable occlusion culling for all such tiles. This can also be done in multiple steps. If t is greater than A then occlusion culling algorithm 1 may be used. Otherwise if t is greater than B then occlusion culling algorithm 2 can be used, where A is greater than B and occlusion culling algorithm 1 is a more expensive algorithm that has a higher chance of culling for more complex tiles.

For inexpensive tiles, we can disable occlusion culling altogether or only use the simplest type of occlusion culling. For more expensive ones, we can enable standard techniques such as Zmax-culling and Zmin-culling, with one Zmin-value and one Zmax value for 16×16 pixels. For even more expensive tiles, we can increase the resolution on the Zmin and Zmax. For example we can have a Zmin and a Zmax per 8×8 tiles. When the tiles are more expensive, we may increase the resolution so that a Zmin and Zmax is stored per 4×4 pixels, and so on. Note that the Zmin-culling may work better for less expensive tiles and it may be worthwhile to enable Zmin culling first and then Zmax culling.

Alternatively, a type of approximate sorting may be used based on depth in the tile. This sorting may be done with a simple binning approach in the depth direction. The geometry is then rasterized in approximate front to back in order to get better occlusion power built up more quickly. This decreases the amount of total work that is done.

Figure 5:
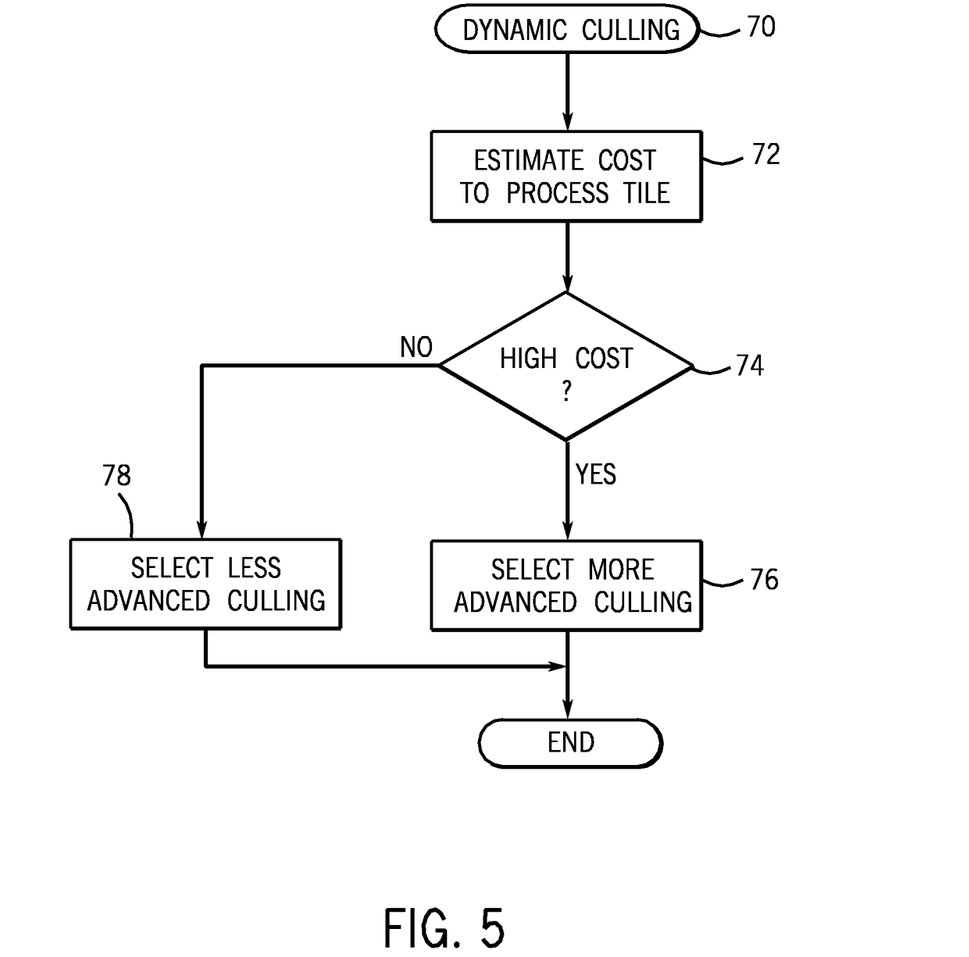
FIG. 5 is a flow chart for another embodiment.

A dynamic culling sequence 70, shown in FIG. 5 may be implemented in software, firmware and/or hardware. In software and firmware embodiments it may be implemented by computer executed instructions stored in a non-transitory computer readable medium such as an optical, magnetic or semi-conductor storage.

The sequence 70 begins by estimating the cost to process a tile as indicated in block 74. If the cost is high enough as determined in diamond 76, a more advanced culling technique is selected as indicated in block 78. Otherwise a less advanced culling technique is selected in block 80.

Figure 6:
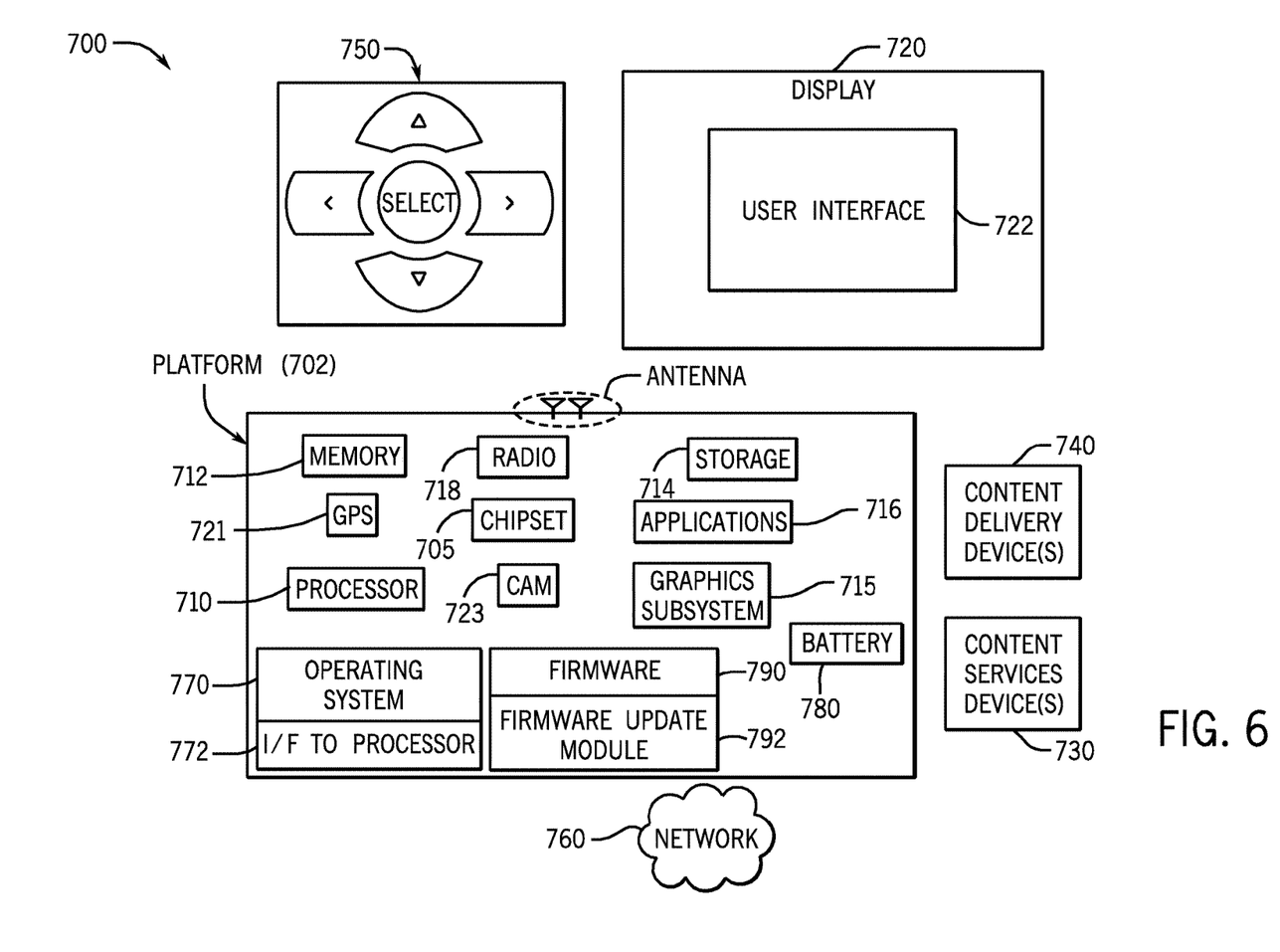
FIG. 6 is a system depiction for one embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716, global positioning system (GPS) 721, camera 723 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

In addition, the platform 702 may include an operating system 770. An interface to the processor 772 may interface the operating system and the processor 710.

Firmware 790 may be provided to implement functions such as the boot sequence. An update module to enable the firmware to be updated from outside the platform 702 may be provided. For example the update module may include code to determine whether the attempt to update is authentic and to identify the latest update of the firmware 790 to facilitate the determination of when updates are needed.

In some embodiments, the platform 702 may be powered by an external power supply. In some cases, the platform 702 may also include an internal battery 780 which acts as a power source in embodiments that do not adapt to external power supply or in embodiments that allow either battery sourced power or external sourced power.

The sequences shown in FIGS. 1 through 5 may be implemented in software and firmware embodiments by incorporating them within the storage 714 or within memory within the processor 710 or the graphics subsystem 715 to mention a few examples. The graphics subsystem 715 may include the graphics processing unit and the processor 710 may be a central processing unit in one embodiment.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 5.

As described above, system 700 may be embodied in varying physical styles or form factors. FIG. 6 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

Figure 7:
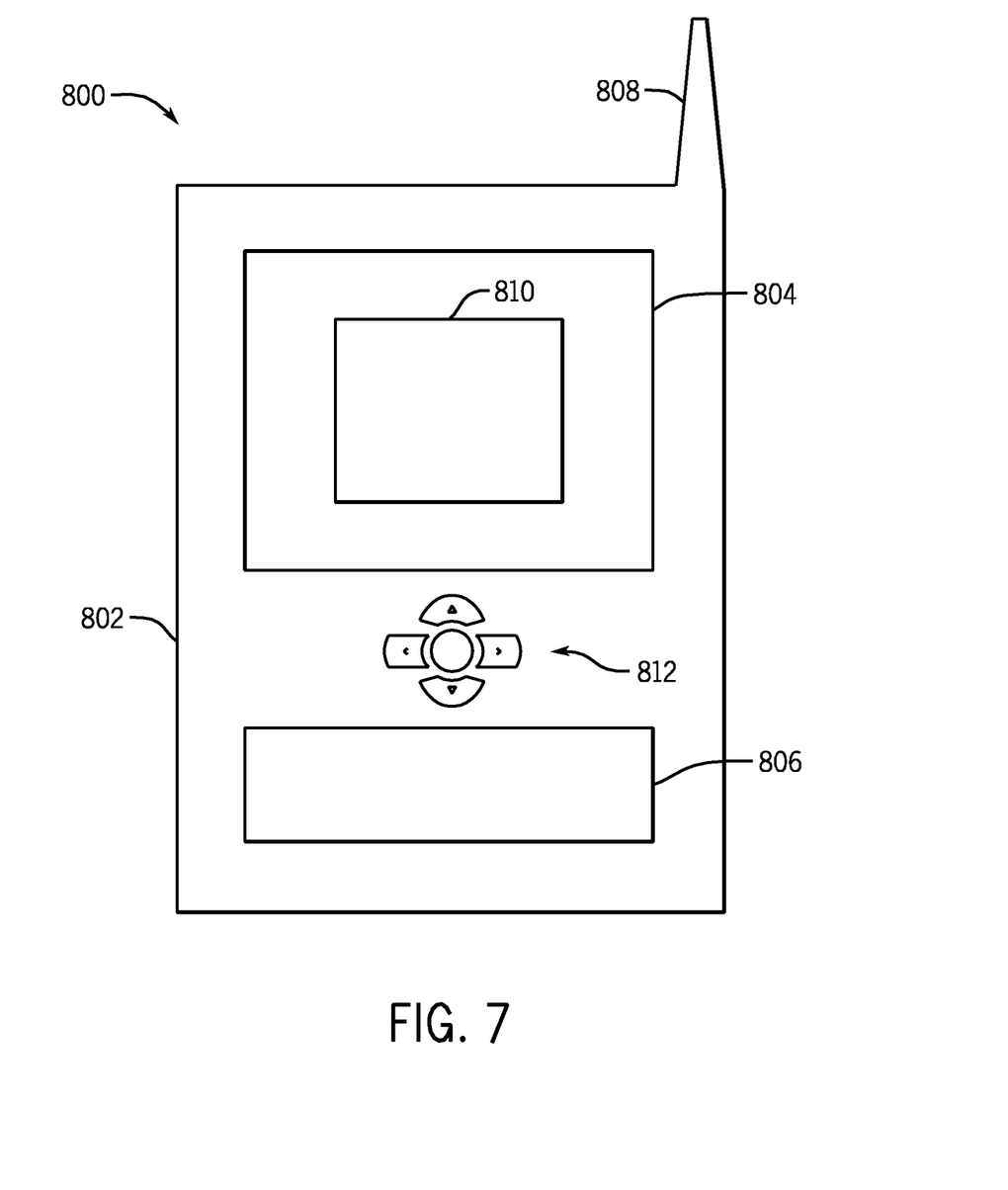
FIG. 7 is front elevational view of an implementation of the system of FIG. 6 in accordance with one embodiment.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

An apparatus comprising a cost estimation unit to determine whether to merge two tiles and a multiple-core processor, each core to work on one tile at a tile. The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multi-core processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining a processing time to process a group of tiles;
   for tiles having a first processing time, disabling occlusion culling;
   for tiles having a second processing time greater than said first processing time, performing occlusion culling;
   for tiles having a third processing time greater than said second processing time, reducing the number of pixels in said group to increase resolution by breaking said group into subgroups;
   assigning a minimum and maximum depth to each of said subgroups for said tiles having the third processing time; and
   assigning a minimum and maximum depth to said group for said tiles having the second processing time.

2. Method of claim 1 including:
based on the time needed for processing tiles, selecting an occlusion culling algorithm to improve processor performance by selecting a culling algorithm whose processing cost is less than the cost of processing culled tiles.

3. The method of claim 2 including selecting more advanced culling technique for higher costs to process tiles and less advanced culling technique for lower cost to process tiles.

4. The method of claim 2 including disabling occlusion culling depending on the cost to process a tile.

5. The method of claim 2 including determining whether or not the cost to process the tile is above a threshold.

6. One or more non-transitory computer readable media storing instructions to perform a sequence comprising:
determining a processing time to process a group of tiles;
for tiles having a first processing time, disabling occlusion culling;
for tiles having a second processing time greater than said first processing time, performing occlusion culling;
for tiles having a third processing time greater than said second processing time, reducing the number of pixels in said group to increase resolution by breaking said group into subgroups;
assigning a minimum and maximum depth to each of said subgroups for said tiles having the third processing time; and
assigning a minimum and maximum depth to said group for said tiles having the second processing time.

7. The media of claim 6 further storing instructions to perform a sequence including based on the time needed for processing tiles, selecting an occlusion culling algorithm to improve processor performance by selecting a culling algorithm whose processing cost is less than the cost of processing culled tiles.

8. The media of claim 7, further storing instructions to perform a sequence including selecting more advanced culling technique for higher costs to process tiles and less advanced culling technique for lower cost to process tiles.

9. The media of claim 8, further storing instructions to perform a sequence including disabling occlusion culling depending on the cost to process a tile.

10. The media of claim 9, further storing instructions to perform a sequence including determining whether or not the cost to process the tile is above a threshold.

11. An apparatus comprising:
a processor to determine a processing time to process a group of tiles, for tiles having a first processing time, disable occlusion culling, for tiles having a second processing time greater than said first processing time, perform occlusion culling, for tiles having a third processing time greater than said second processing time, reduce the number of pixels in said group to increase resolution by breaking said group into subgroups, assign a minimum and maximum depth to each of said subgroups for said tiles having the third processing time, and assign a minimum and maximum depth to said group for said tiles having the second processing time; and
a memory coupled to said processor.

12. The apparatus of claim 11,
said processor to select an occlusion culling algorithm to improve processor performance by selecting a culling algorithm whose processing cost is less than the cost of processing culled tiles.

13. The apparatus of claim 12, said processor to select a more advanced culling technique for higher cost to process tiles and a less advanced culling technique for lower cost to process tiles.

14. The apparatus of claim 12, said processor to disable occlusion culling depending on the cost to process a tile.

15. The apparatus of claim 12, said processor to determine whether or not the cost to process the tile is above a threshold.

* * * * *